(12) United States Patent
Midorikawa

(10) Patent No.: US 10,289,187 B2
(45) Date of Patent: May 14, 2019

(54) ELECTRONIC DEVICE AND METHOD

(71) Applicant: Toshiba Client Solutions CO., LTD., Koto-ku, Tokyo (JP)

(72) Inventor: Makoto Midorikawa, Hamura Tokyo (JP)

(73) Assignee: Toshiba Client Solutions Co., Ltd., Tokyo (JP)

( * ) Notice: Subject to any disclaimer, the term of this patent is extended or adjusted under 35 U.S.C. 154(b) by 0 days.

(21) Appl. No.: 15/372,233

(22) Filed: Dec. 7, 2016

(65) Prior Publication Data

US 2017/0168547 A1 Jun. 15, 2017

Related U.S. Application Data

(60) Provisional application No. 62/266,260, filed on Dec. 11, 2015.

(51) Int. Cl.
| | |
|---|---|
| *G06F 3/02* | (2006.01) |
| *G06F 1/3234* | (2019.01) |
| *G06F 1/3215* | (2019.01) |
| *H05B 33/08* | (2006.01) |
| *G06F 1/26* | (2006.01) |

(52) U.S. Cl.
CPC .......... *G06F 1/3271* (2013.01); *G06F 1/3215* (2013.01); *H05B 33/0854* (2013.01); *G06F 1/263* (2013.01); *Y02D 10/156* (2018.01)

(58) Field of Classification Search
None
See application file for complete search history.

(56) References Cited

U.S. PATENT DOCUMENTS

| | | | | |
|---|---|---|---|---|
| 5,854,617 A | * | 12/1998 | Lee | G06F 1/3218 345/102 |
| 8,655,412 B2 | | 2/2014 | Chiba | |
| 2001/0040538 A1 | * | 11/2001 | Quanrud | G02F 1/136 345/55 |
| 2006/0192748 A1 | * | 8/2006 | Lowles | G06F 1/3203 345/102 |
| 2009/0143108 A1 | | 6/2009 | Chiba | |
| 2011/0037704 A1 | * | 2/2011 | Ku | G06F 3/0202 345/170 |

FOREIGN PATENT DOCUMENTS

| | | |
|---|---|---|
| JP | 2004-302855 A | 10/2004 |
| JP | 2006-243725 A | 9/2006 |
| JP | 2007-316974 A | 12/2007 |
| JP | 2009-135776 A | 6/2009 |

* cited by examiner

*Primary Examiner* — Carl Adams
(74) *Attorney, Agent, or Firm* — Knobbe, Martens, Olson & Bear, LLP

(57) ABSTRACT

According to one embodiment, an electronic device includes a keyboard, a backlight and a hardware processor. The backlight illuminates the keyboard. The hardware processor is electrically coupled to the backlight. The hardware processor is configured to gradually decrease brightness of the backlight during a period of time of which the backlight is continuously on.

12 Claims, 7 Drawing Sheets

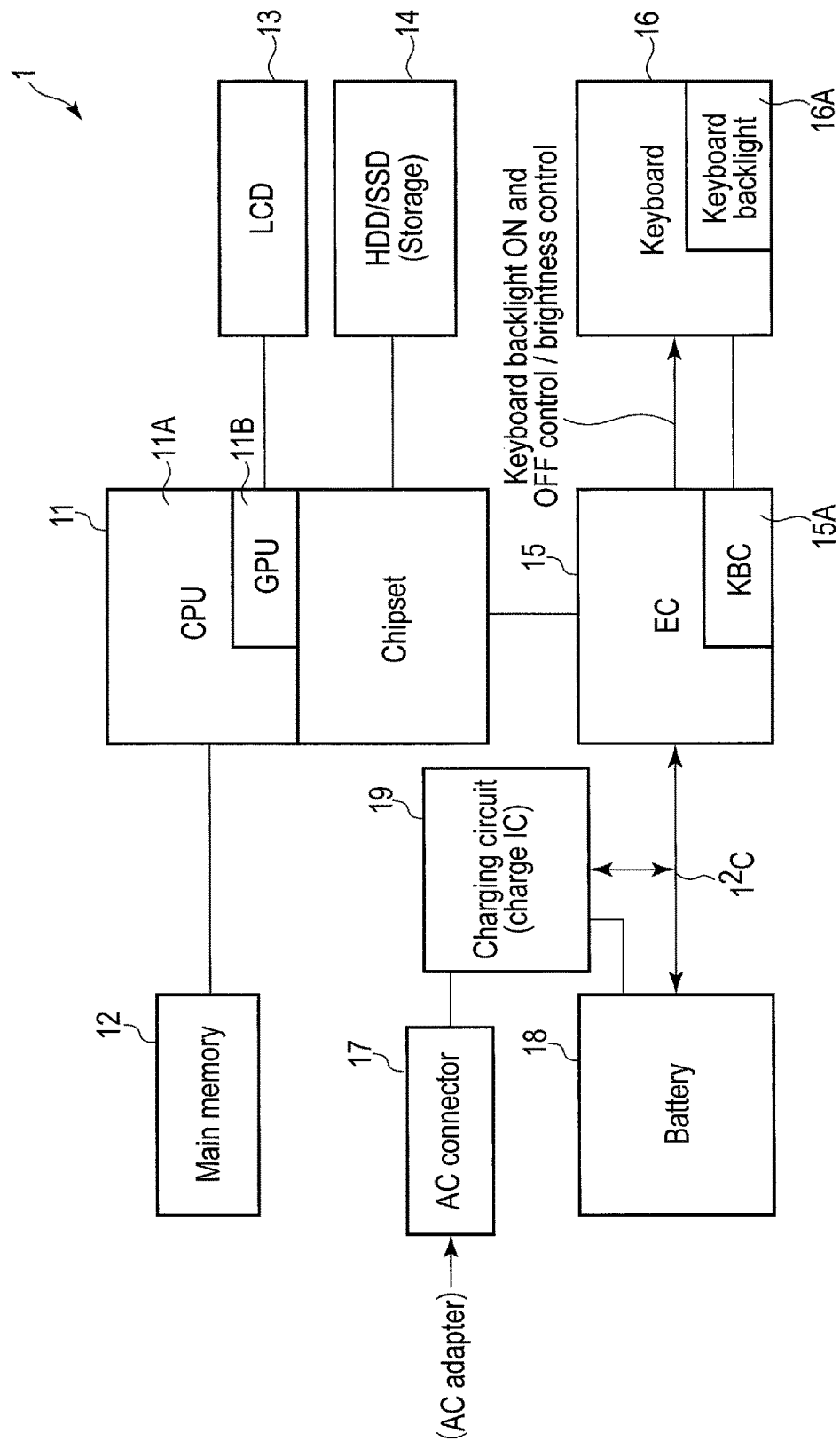
F I G. 2

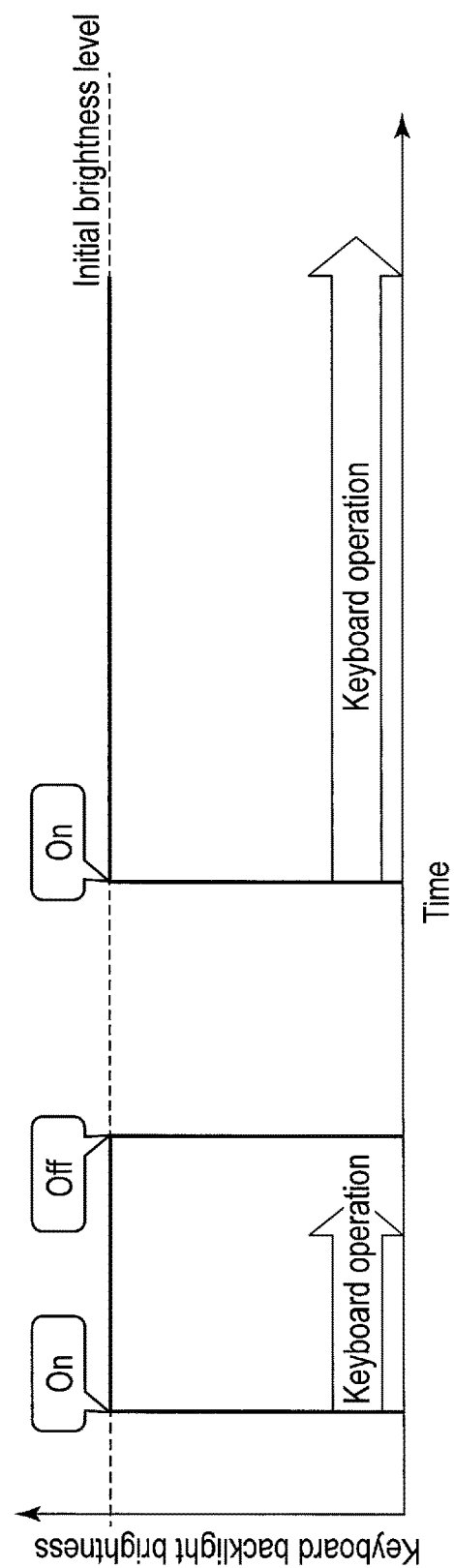
F I G. 5

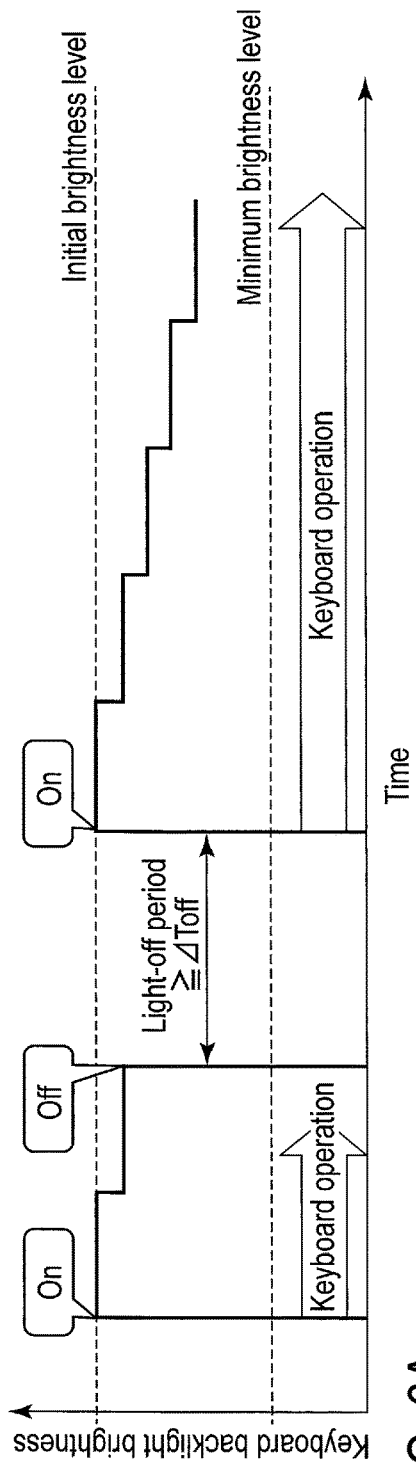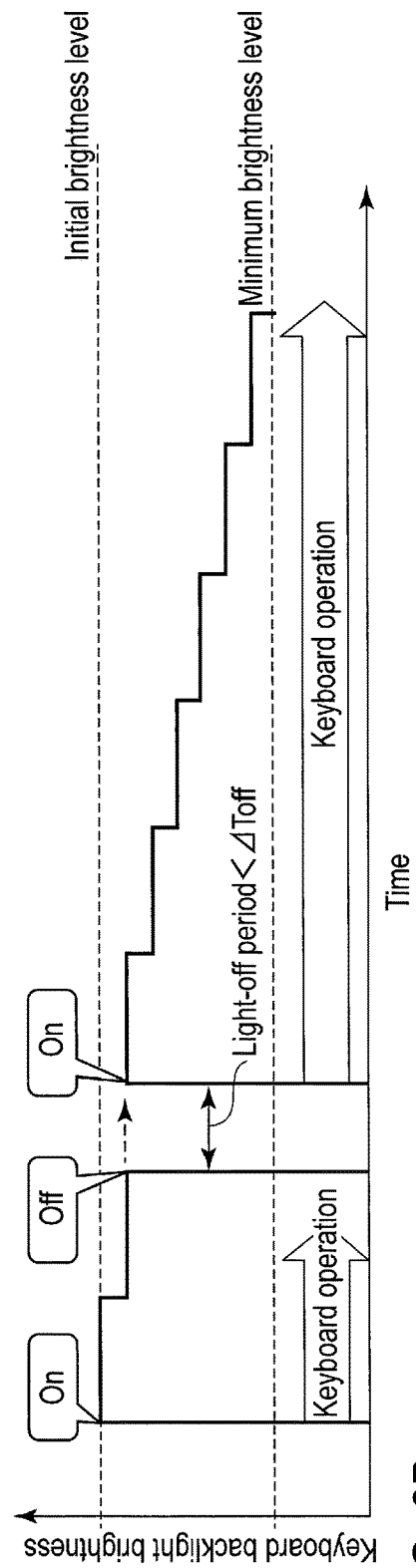

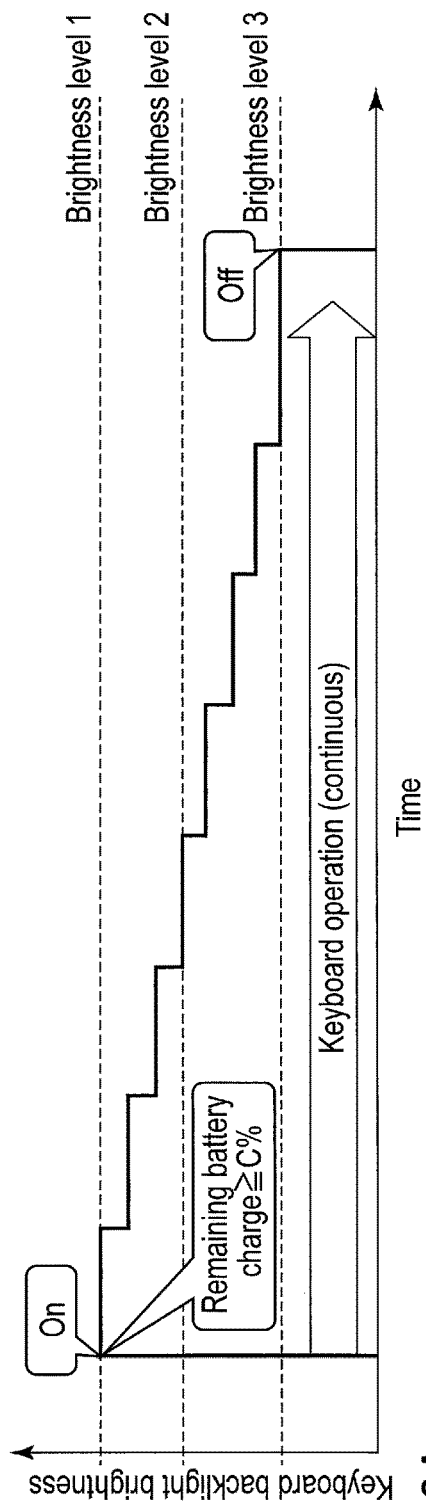
F I G. 8A
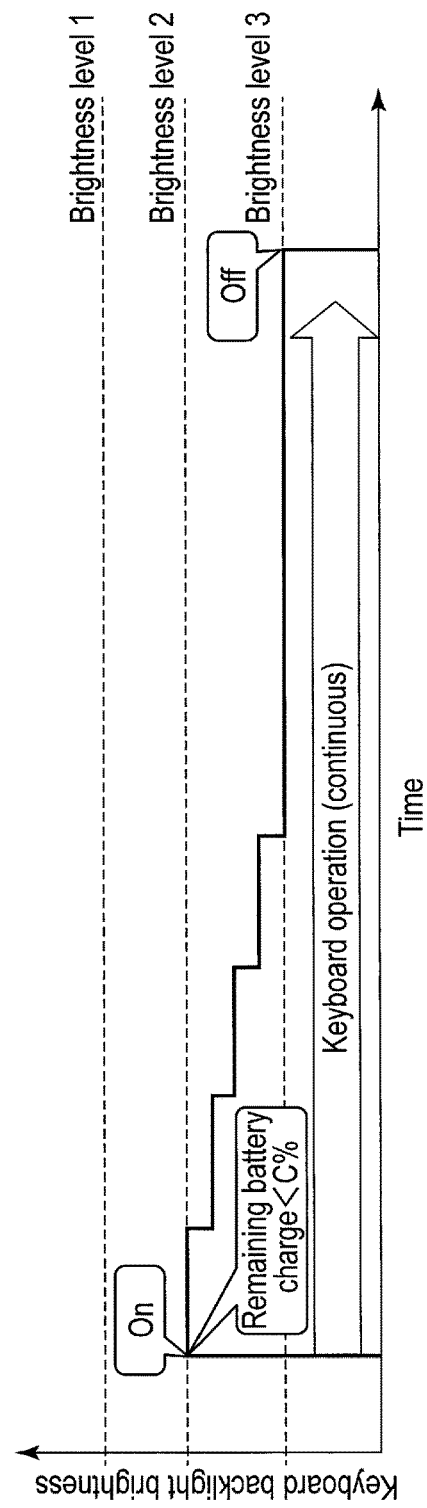
F I G. 8B

ELECTRONIC DEVICE AND METHOD

CROSS-REFERENCE TO RELATED APPLICATIONS

This application claims the benefit of U.S. Provisional Application No. 62/266,260, filed Dec. 11, 2015, the entire contents of which are incorporated herein by reference.

FIELD

Embodiments described herein relate generally to an electronic device and a method.

BACKGROUND

Recently, a battery-powered portable electronic device such as a notebook personal computer (PC) and the like has become widespread. Such electronic devices are often equipped with a keyboard having a backlight in order to improve operability in the dark. The backlight of the keyboard is hereinafter referred to as a keyboard backlight. Generally, the keyboard backlight is turned on if the keyboard is operated and turned off if the keyboard is not operated for a certain period. While the keyboard backlight is on, the brightness of the keyboard backlight is generally maintained at a brightness level set by a user.

It should be noted that the energy consumed by the keyboard backlight forms a relatively large proportion of the energy consumed by the entire electronic device. Therefore, if the electronic device is powered by a battery, the lighting of the keyboard backlight greatly affects the operating time of the electronic device.

One reason for needing the keyboard backlight is that the user should check the position of the keys of the keyboard in the dark. After checking the position of the keys, some users touch-type, i.e., operate the keyboard without looking at the keyboard. Even if the user does not touch-type, the need to keep the keyboard backlight bright is small because the user's eyes adjust to the dark with time.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary diagram showing an example of a system configuration of the electronic device of the embodiment.

FIG. 5 is an exemplary graph showing brightness control executed when the keyboard backlight is turned on again in a general electronic device.

FIG. 6A is an exemplary first graph showing an example of brightness control executed when the keyboard backlight is turned on again in the electronic device of the embodiment (in the case where a light-off period is long).

FIG. 6B is an exemplary second graph showing an example of the brightness control executed when the keyboard backlight is turned on again in the electronic device of the embodiment (in the case where the light-off period is short).

FIG. 8A is an exemplary first graph showing an example of brightness control executed according to the remaining battery charge when the keyboard backlight is turned on in the electronic device of the embodiment (in the case where the remaining battery charge is great).

FIG. 8B is an exemplary second graph showing an example of the brightness control executed according to the remaining battery charge when the keyboard backlight is turned on in the electronic device of the embodiment (in the case where the remaining charge power is small).

DETAILED DESCRIPTION

Various embodiments will be described hereinafter with reference to the accompanying drawings.

In general, according to one embodiment, an electronic device includes a keyboard, a backlight and a hardware processor. The backlight illuminates the keyboard. The hardware processor is electrically coupled to the backlight. The hardware processor is configured to gradually decrease brightness of the backlight during a period of time of which the backlight is continuously on.

Figure 1:
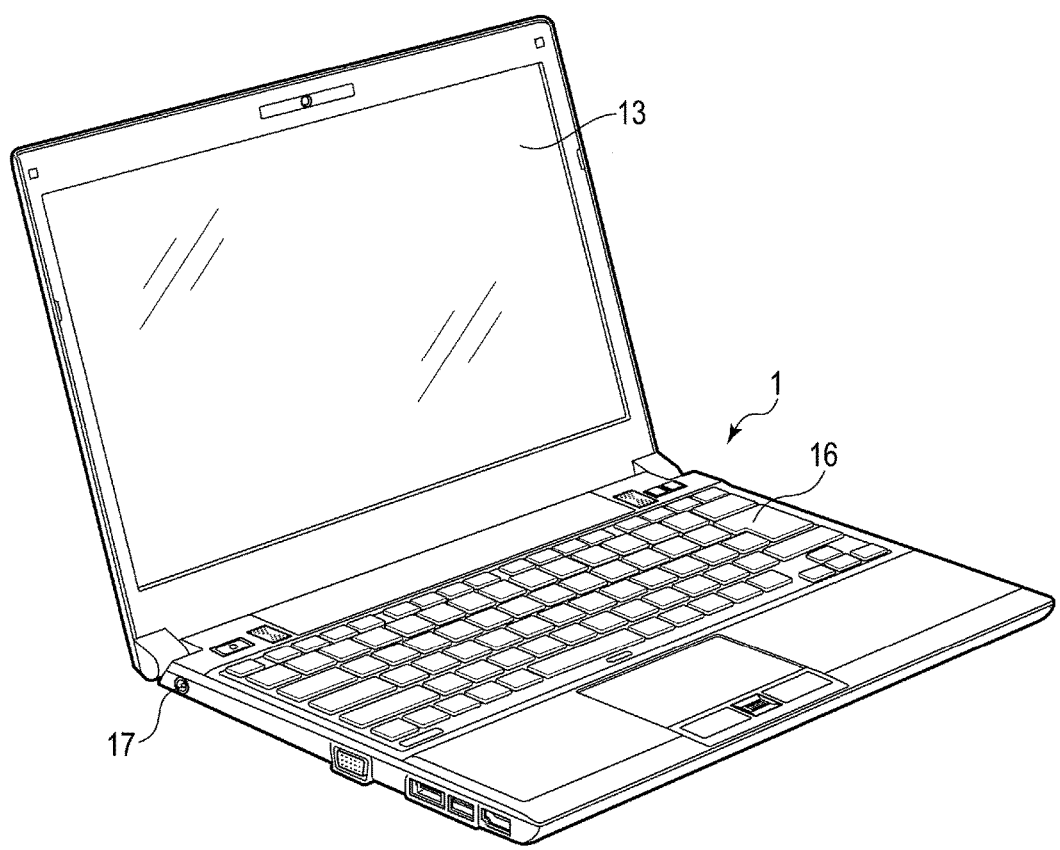
FIG. 1 is an exemplary illustration showing an example of an appearance of an electronic device of an embodiment.

FIG. 1 is an exemplary illustration showing an example of an appearance of an electronic device of an embodiment. As shown in FIG. 1, an electronic device 1 may be implemented as a notebook PC and the like.

FIG. 1 is a front perspective view of the electronic device 1 with a display unit opened. A liquid crystal display (LCD) 13 is incorporated into the display unit. A keyboard 16 is provided on the upper surface of a main body to which the display unit is attached rotatably. The keyboard 16 comprises, for example, mechanical keys. A keyboard backlight 16A (not shown in FIG. 1) is attached behind (under) the keys. An AC connector 17 for connecting an AC adapter is provided, for example, on the left side surface of the main body. A battery 18 (not shown in FIG. 1) is detachably provided within the main body. Therefore, the electronic device 1 can be powered by the battery 18 when an external power source (AC adapter) cannot be made available via the AC connector 17, for instance, when the user is on the move.

FIG. 2 is an exemplary diagram showing an example of a system configuration of the electronic device 1.

As shown in FIG. 2, the electronic device 1 comprises a chipset 11, a main memory 12, a hard disk drive (HDD)/solid-state drive (SSD) 14, an embedded controller (EC) 15 and a charging circuit 19 in addition to the LCD 13, the keyboard 16, the AC connector 17 and the battery 18.

The chipset 11 is a processing circuit including a central processing unit (CPU) 11A and a graphics processing unit (GPU) 11B. The CPU 11A executes various programs loaded from the HDD/SSD 14 into the main memory 12. The GPU 11B controls the LCD 13.

The EC 15 is a single-chip microcomputer including a keyboard controller (KBC) 15, and executes power management of the electronic device 1. The KBC 15A controls key input from the keyboard 16. The EC 15 executes I²C communication with an IC included in the battery 18 (battery IC) and the charging circuit 19. The EC 15 regularly obtains and monitors the remaining charge of the battery 18 by communicating with the battery IC. The EC 15 can detect whether the AC adapter is connected to the AC connector 17, more specifically, whether power is input from the external power source, by communicating with the charging circuit 19. The EC 15 can also instruct the charging circuit 19 to supply the power from the external power source made available via the AC connector 17 to each component in the electronic device 1, to supply the power from the battery 18 to each component in the electronic device 1, and to charge the battery 18 using the external power source made available via the AC connector 17, by communicating with the charging circuit 19. The EC 15 is further connected to the keyboard backlight 16A and has functions of turning the keyboard backlight 16A on and off and controlling the brightness of the keyboard backlight 16A.

Under the control of the EC 15, the charging circuit 19 supplies the power from the external power source made available via the AC connector 17 or the battery 18 to each component in the electronic device 1, and charges the battery 18 using the external power source made available via the AC connector 17.

Next, an example of control of the keyboard backlight 16A executed by the EC 15 of the above-described electronic device 1 is described.

In order to facilitate the understanding of the control of the keyboard backlight 16A executed by the EC 15 of the electronic device 1, keyboard backlight control executed in a general electronic device is first described with reference to FIG. 3.

Figure 3:
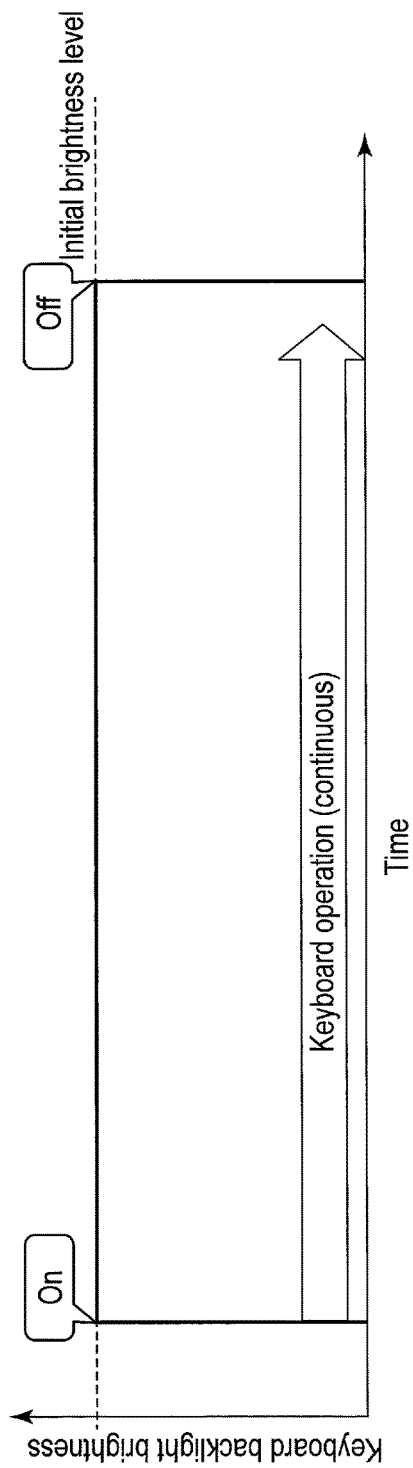
FIG. 3 is an exemplary graph showing keyboard backlight control executed in a general electronic device.

As shown in FIG. 3, in an electronic device equipped with a keyboard having a keyboard backlight, the keyboard backlight is turned on when the keyboard is operated. At this time, the brightness of the keyboard backlight is at a brightness level set by the user (initial brightness level). The keyboard backlight is on during the keyboard operation. The brightness of the keyboard backlight is maintained at the initial brightness level while the keyboard backlight is on. The keyboard backlight is turned off if a certain period has passed since the keyboard operation is finished, in other words, if the keyboard is not operated for a certain period.

As described above, the brightness of the keyboard backlight generally remains constant at the initial brightness level from beginning to end of the light-on period. However, it may be considered that energy is wasted by keeping the keyboard backlight bright since many users only need to check the position of the keys at the beginning of the keyboard operation and the user's eyes gradually adjust to the dark. In particular, the impact of wasted energy is significant when the electronic device is powered by the battery.

Figure 4:
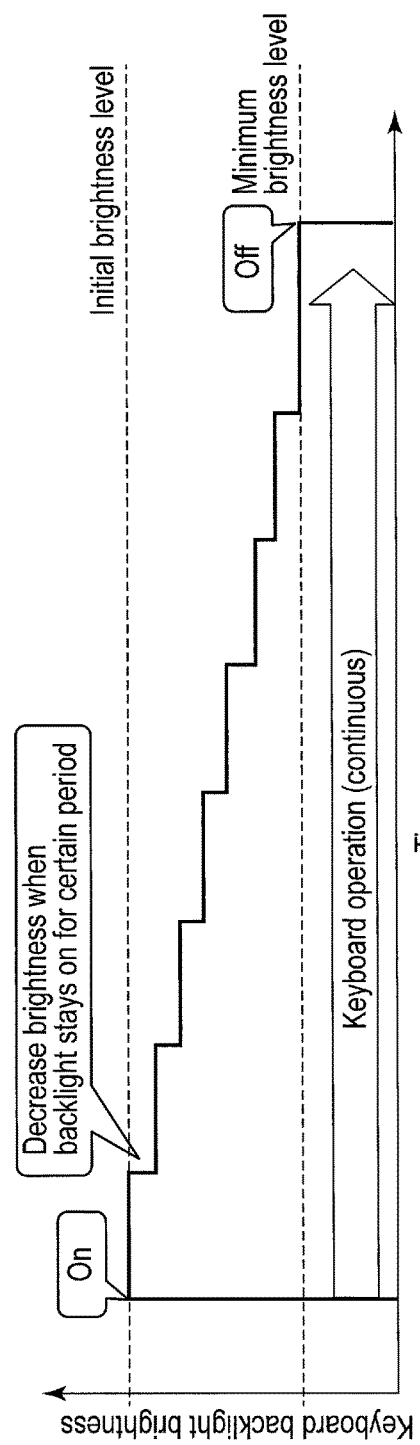
FIG. 4 is an exemplary graph showing an example of keyboard backlight control executed in the electronic device of the embodiment.

On the basis of the above point, an example of control of the keyboard backlight 16A executed by the EC 15 of the electronic device 1 is described with reference to FIG. 4.

The EC 15 turns on the keyboard backlight 16A if the KBC 15A receives key input from the keyboard 16 under circumstances where the EC 15 detects that power is not input from the external power source by communicating with the charging circuit 19. At this time, the EC 15 turns on the keyboard backlight 16A at an initial brightness level.

After turning on the keyboard backlight 16A, the EC 15 counts the time during which the keyboard backlight 16A is continuously on. If the count value (time) reaches a predetermined value, the EC 15 makes the brightness of the keyboard backlight 16A one level lower. At this time, the EC 15 resets the counter and restarts counting of the time during which the keyboard backlight 16A is continuously on. If the count value (time) reaches the predetermined value again, the EC 15 further makes the brightness of the keyboard backlight 16A one level lower. The EC 15 repeats the above process until the brightness of the keyboard backlight 16A has been decreased to a predetermined minimum brightness level. If the KBC 15A does not receive key input from the keyboard 16 for a certain period, the EC 15 turns off the keyboard backlight 16A.

That is, the EC 15 gradually decreases the brightness of the keyboard backlight 16A from the initial brightness level to the minimum brightness level at regular intervals while the keyboard backlight 16A is continuously on. Energy can thereby be prevented from being wasted by keeping the keyboard backlight 16A bright. Since the brightness of the keyboard backlight 16A is gradually decreased, user discomfort can be prevented.

In the above example, the brightness of the keyboard backlight 16A is gradually decreased when the electronic device 1 is powered by the battery 18. However, the brightness of the keyboard backlight 16A may be gradually decreased when the electronic device 1 is powered by the external power source made available via the AC connector 17. In addition, in the above example, the brightness of the keyboard backlight 16A is gradually decreased from the initial brightness level to the minimum brightness level. However, the EC 15 may turn off the keyboard backlight 16A instead of making the brightness at the minimum brightness level.

Next, an example of brightness control executed by the EC 15 of the electronic device 1 when the keyboard backlight 16A is turned on again is further described.

In order to facilitate the understanding of the brightness control executed by the EC 15 of the electronic device 1 when the keyboard backlight 16A is turned on again, backlight control executed when a keyboard backlight is turned on again in a general electronic device is first described with reference to FIG. 5.

As described above, in an electronic device equipped with a keyboard having a keyboard backlight, the keyboard backlight is turned on at an initial brightness level when the keyboard is operated, stays on at the initial brightness level during the keyboard operation, and is turned off if the keyboard is not operated for a certain period. If the keyboard backlight is turned off and then turned on again in response to keyboard operation, the keyboard backlight stays on at the initial brightness level as shown in FIG. 5.

In contrast, the EC 15 of the electronic device 1 configured to gradually decrease the brightness of the keyboard backlight 16A controls the brightness of the keyboard backlight 16A in consideration of a light-off period of the keyboard backlight 16A when the keyboard backlight 16A is turned on again. An example of the brightness control executed by the EC 15 of the electronic device 1 when the keyboard backlight 16A is turned on again is described with reference to FIG. 6A and FIG. 6B.

FIG. 6A shows the brightness and the transition of the brightness when the keyboard backlight 16A is turned on again in the case where a light-off period of the keyboard backlight 16A is greater than or equal to a certain period.

It is assumed that the keyboard backlight 16A is turned off after the brightness of the keyboard backlight 16A becomes one level lower. When turning off the keyboard backlight 16A, the EC 15 records the brightness level of the keyboard backlight 16A at the time and also counts a time during which the keyboard backlight 16A is off. When turning on the keyboard backlight 16A again in response to a reception of key input from the keyboard 16 to the KBC 15A, the EC 15 checks whether the count value (time) is greater than or equal to a predetermined value. If the count value is greater than or equal to the predetermined value, the EC 15 turns on the keyboard backlight 16A at the initial brightness level. The EC 15 gradually decreases the brightness of the keyboard backlight 16A from the initial brightness level as described above. The count of the time during which the keyboard backlight 16A is off may be stopped at the time when the count value reaches the predetermined value.

FIG. 6B shows the brightness and the transition of the brightness when the keyboard backlight 16A is turned on again in the case where the light-off period of the keyboard backlight 16A is less than the certain period.

If the count value (time) is less than the predetermined value when the keyboard backlight 16A is turned on again, the EC 15 turns on the keyboard backlight 16A at the recorded brightness level. The EC 15 gradually decreases the brightness of the keyboard backlight 16A from the recorded brightness level as described above.

If the light-off period of the keyboard backlight 16A is short, there is a high possibility that the user need not check the position of the keys of the keyboard 16 again. In addition, the eyes of the user (who does not touchtype) have already adjusted to the brightness of the keyboard backlight 16A at the time of the turning off. Therefore, it is possible to provide the user with a natural feeling and further reduce the energy consumed by turning on the keyboard backlight 16A at the brightness level at the time of the turning off of the keyboard backlight 16A.

Figure 7:
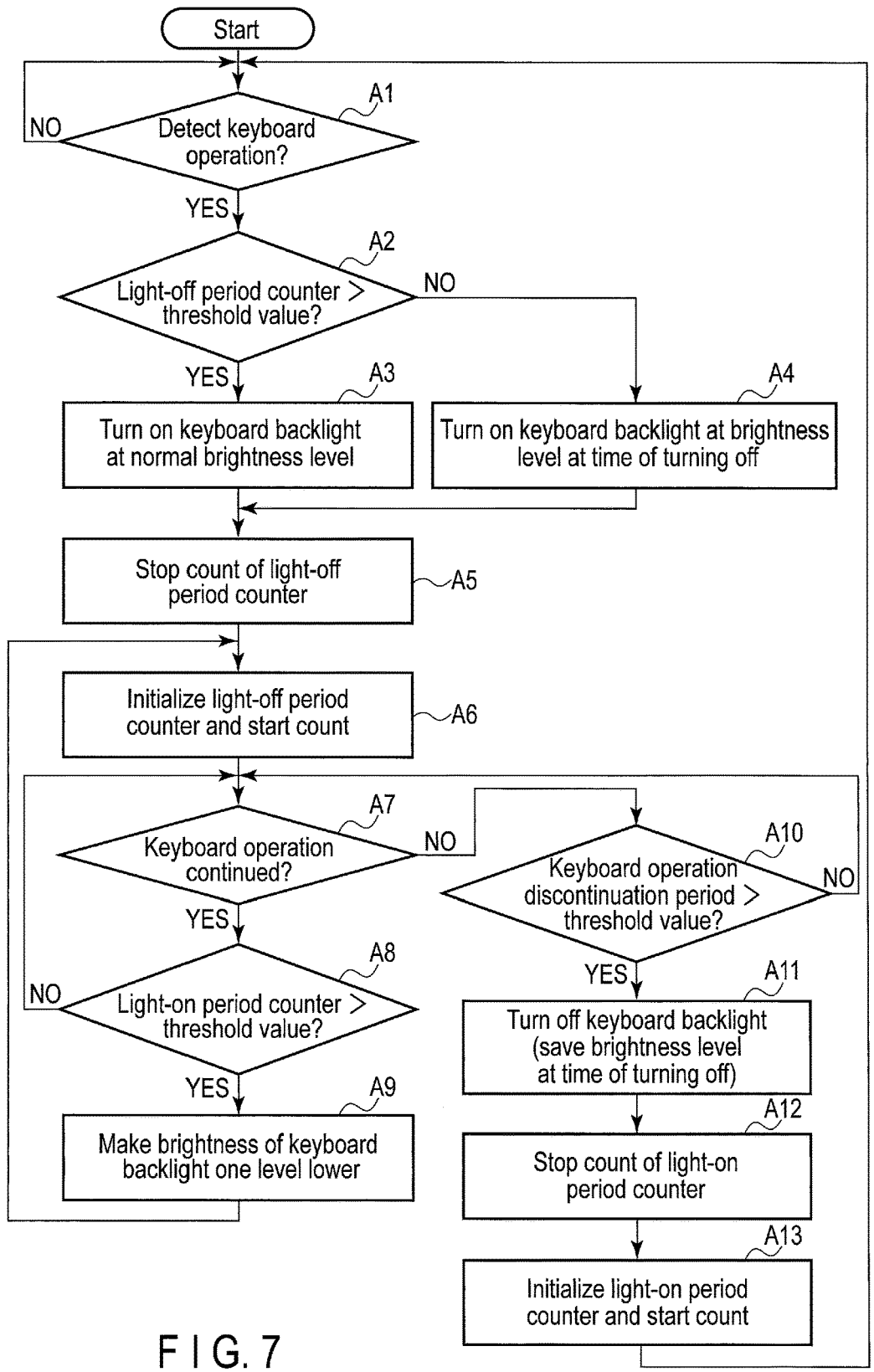
FIG. 7 is an exemplary flowchart showing a flow of the keyboard backlight control executed in the electronic device of the embodiment.

FIG. 7 is an exemplary flowchart showing a flow of control of the keyboard backlight 16A in the electronic device 1. It is hereinafter assumed that the EC 15 detects that the power is not input from the external power source. However, the control of the keyboard backlight 16A may be executed even when the power is input from the external power source as described above.

If operation of the keyboard 16 is detected (YES in block A1), the EC 15 determines whether a value of a counter indicating a light-off period of the keyboard backlight 16A (light-off period counter) exceeds a threshold value (block A2). If the value of the counter exceeds the threshold value (YES in block A2), the EC 15 turns on the keyboard backlight 16A at a normal brightness level, i.e., the initial brightness level (block A3). If the value of the counter does not exceed the threshold value (NO in block A2), the EC 15 turns on the keyboard backlight 16A at a brightness level at the time of the turning off of the keyboard backlight 16A (block A4). When turning on the keyboard backlight 16A, the EC 15 stops counting the light-off period of the keyboard backlight 16A (block A5).

When turning on the keyboard backlight 16A, the EC 15 starts counting a light-on period of the keyboard backlight 16A (block A6). The EC 15 monitors whether the operation of the keyboard 16 is continued (block A7). If the operation is continued (YES in block A7), the EC 15 determines whether a value of a counter indicating the light-on period of the keyboard backlight 16A (light-on period counter) exceeds a threshold value (block A8). If the value exceeds the threshold value (YES in block A8), the EC 15 makes the brightness of the keyboard backlight 16A one level lower (block A9), returns to block A6, resets the light-on period counter and restarts counting a light-on period of the keyboard backlight 16A. The EC 15 repeats the process of monitoring whether the operation of the keyboard 16 is continued, etc. (blocks A7 and A8).

If the value of the counter indicating the light-on period of the keyboard backlight 16A does not exceed the threshold value (NO in block A8), the EC 15 returns to block A7 and repeats the process of monitoring whether the operation of the keyboard 16 is continued, etc. (blocks A7 and A8). It should be noted that the threshold value is several seconds, several tens of seconds or at most several minutes.

If the operation of the keyboard 16 is not continued (NO in block A7), the EC 15 monitors whether a period during which the operation of the keyboard 16 is stopped exceeds a threshold value (block A10). If the period exceeds the threshold value (YES in block A10), the EC 15 turns off the keyboard backlight 16A (block A11). The EC 15 records the brightness level of the keyboard backlight 16A at the time of the turning off.

When turning off the keyboard backlight 16A, the EC 15 stops counting the light-on period of the keyboard backlight 16A (block A12) and starts counting a light-off period of the keyboard backlight 16A (block A13). The EC 15 returns to block A1 and monitors the operation of the keyboard 16.

As described above, according to the electronic device 1 of the embodiment, the keyboard backlight 16A can be controlled so as to reduce the energy consumed by the keyboard backlight 16A which forms a relatively large proportion of the energy consumed by the entire electronic device 1.

In the description above, the keyboard backlight 16A is turned on at the fixed initial brightness level if the light-off period exceeds the certain time when turning on the keyboard backlight 16A. The EC 15 may be further configured to change the brightness level of the keyboard backlight 16A at the time of turning on (i.e., initial brightness level) according to a remaining charge of the battery 18 when the electronic device 1 is powered by the battery 18. The change of the brightness level of the keyboard backlight 16A according to the remaining charge of the battery 18 is hereinafter described with reference to FIG. 8A and FIG. 8B. It is assumed that a first initial brightness level and a second initial brightness level which is lower than the first initial brightness level are set as brightness levels of the keyboard backlight 16A.

FIG. 8A shows the brightness and the transition of the brightness of the keyboard backlight 16A in the case where the remaining charge of the battery 18 is greater than or equal to a predetermined value.

When turning on the keyboard backlight 16A, the EC 15 checks whether the remaining charge of the battery 18 is greater than or equal to the predetermined value. If the remaining charge is greater than or equal to the predetermined value, the EC 15 turns on the keyboard backlight 16A at the first initial brightness level (brightness level 1). The EC 15 gradually decreases the brightness of the keyboard backlight 16A from the first initial brightness level to a minimum brightness level (brightness level 3) as described above.

FIG. 8B shows the brightness and the transition of the brightness of the keyboard backlight 16A in the case where the remaining charge of the battery 18 is less than the predetermined value.

If the remaining charge of the battery 18 is less than the predetermined value when turning on the keyboard backlight 16A, the EC 15 turns on the keyboard backlight 16A at the second initial brightness level (brightness level 2). The EC 15 gradually decreases the brightness of the keyboard backlight 16A from the second initial brightness level to the minimum brightness level (brightness level 3) as described above.

In this manner, when the electronic device 1 is powered by the battery 18, the energy consumed by the keyboard backlight 16A can be further reduced by changing the brightness level of the keyboard backlight 16A at the time of turning on according to the remaining charge of the battery 18.

In the above-described embodiment, the brightness of the keyboard backlight 16A is controlled based on a light-on period and a light-off period of the keyboard backlight 16A. Since turning on and off of the keyboard backlight 16A depend on whether or not the keyboard 16 is operated, the brightness of the keyboard backlight 16A may be controlled based on a period during which the keyboard 16 is continuously operated and a period during which the keyboard 16 is not operated. In other words, controlling the brightness of the keyboard backlight 16A based on the light-on period and the light-off period of the keyboard backlight 16A has the same meaning of controlling the brightness of the keyboard backlight 16A based on the period during which the keyboard 16 is continuously operated and the period during which the keyboard 16 is not operated.

Each of the various functions described in the embodiment may be implemented by a processing circuit (hardware processor). Examples of the processing circuit include a programmed processor such as a central processing unit (CPU). The processor executes each of the described functions by executing a program stored in a memory. The processor may be a microprocessor including an electric circuit. Examples of the processing circuit also include a digital signal processor (DSP), an application-specific integrated circuit (ASIC), a microcontroller, a controller and other electric circuit components.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
    a keyboard;
    a keyboard backlight attached to the keyboard; and
    a hardware processor connected to the keyboard backlight, and configured to perform controlling of turning the keyboard backlight on and off and controlling of brightness of the keyboard backlight,
    wherein the hardware processor is configured to
    turn on the keyboard backlight at an initial brightness level if a key input from the keyboard is received under circumstances where power is input from an internal battery,
    gradually decrease brightness of the keyboard backlight in accordance with a period of time of which the keyboard backlight is continuously on,
    record, if the keyboard backlight is turned off in a state where the brightness of the keyboard backlight is decreased to a first brightness level, the first brightness level, and
    turn on the keyboard backlight at the first brightness level, if the keyboard backlight is turned on again within a predetermined first period after the keyboard backlight is turned off.

2. The electronic device of claim 1, wherein the hardware processor is configured to gradually decrease the brightness of the keyboard backlight from the initial brightness level until the brightness of the keyboard backlight is decreased to the minimum brightness level by one level at a time recurrently when a light-on period count exceeds a threshold value while the keyboard backlight is on.

3. The electronic device of claim 1, wherein the hardware processor is configured to turn on the keyboard backlight at the initial brightness level, if the keyboard backlight is turned on again after the predetermined first period.

4. The electronic device of claim 1, wherein the hardware processor is configured to change the initial brightness level of the keyboard backlight in accordance with a remaining charge of the internal battery.

5. The electronic device of claim 4, wherein the hardware processor is configured to
    turn on the keyboard backlight at a first brightness level, if the remaining charge of the battery is a first remaining charge, and
    turn on the keyboard backlight at a second brightness level which is less than the first brightness level, if the remaining charge of the battery is a second remaining charge which is less than the first remaining charge.

6. The electronic device of claim 1, wherein the hardware processor is configured to
    turn on the keyboard backlight again, if the keyboard is operated while the keyboard backlight is off; and
    turn off the keyboard backlight, if the keyboard is not operated for a third period while the keyboard backlight is on.

7. A method for an electronic device comprising a keyboard to which a keyboard backlight is attached, the method comprising:
    turning on the keyboard backlight at an initial brightness level if a key input from the keyboard is received under circumstances where power is input from an internal battery;
    monitoring a period of time of which the keyboard backlight is continuously on;
    gradually decreasing brightness of the keyboard backlight in accordance with the period of time of which the keyboard backlight is continuously on;
    recording, if the keyboard backlight is turned off in a state where the brightness of the keyboard backlight is decreased to a first brightness level, the first brightness level; and
    turning on the keyboard backlight at the first brightness level, if the keyboard backlight is turned on again within a predetermined first period after the keyboard backlight is turned off.

8. The method of claim 7, further comprising gradually decreasing the brightness of the keyboard backlight from the initial brightness level until the brightness of the keyboard backlight is decreased to the minimum brightness level by one level at a time recurrently when a light-on period count exceeds a threshold value while the keyboard backlight is on.

9. The method of claim 7, further comprising turning on the keyboard backlight at the initial brightness level if the keyboard backlight is turned on again after the predetermined first period.

10. The method of claim 7, further comprising changing the initial brightness level of the keyboard backlight at a time of turning on in accordance with a remaining charge of the internal battery.

11. The method of claim 10, further comprising:
- turning on the keyboard backlight at a first brightness level, if the remaining charge of the battery is a first remaining charge; and
- turning on the keyboard backlight at a second brightness level which is less than the first brightness level, if the remaining charge of the battery is a second remaining charge which is less than the first remaining charge.

12. The method of claim 7, further comprising:
- turning on the keyboard backlight again, if the keyboard is operated while the keyboard backlight is off; and
- turning off the backlight, if the keyboard is not operated for a third period while the keyboard backlight is on.

* * * * *